Sept. 16, 1952  W. WILCOX ET AL  2,610,859

QUICK-EXHAUSTING VALVE

Filed July 9, 1949

INVENTORS
WARREN WILCOX
BY DONALD E. DANIEL

Fulwider & Mattingly
Attorneys

Patented Sept. 16, 1952

2,610,859

UNITED STATES PATENT OFFICE 2,610,859

QUICK-EXHAUSTING VALVE

Warren Wilcox and Donald E. Daniel, Oakland, Calif., assignors to Modern Products, Inc., Los Angeles, Calif., a corporation of California Application July 9, 1949, Serial No. 103,918

1 Claim. (Cl. 277—44)

This invention relates to a quick exhausting valve adapted to control the flow of air under pressure to machine tools and the like.

The main objects of this invention are: to provide a simple and efficient valve for controlling the flow of a fluid such as air under pressure; to provide a valve of this character which is very rapid and quick in its operation from one position to another; and to provide a quick exhausting valve which provides an effective seal for passing air under pressure to an air operated machine, and upon reversal will quickly move to a position whereby the air passed therethrough is thereupon exhausted or vented to the atmosphere.

An illustrative embodiment of this invention is shown in the accompanying drawings, in which.

Figure 1:
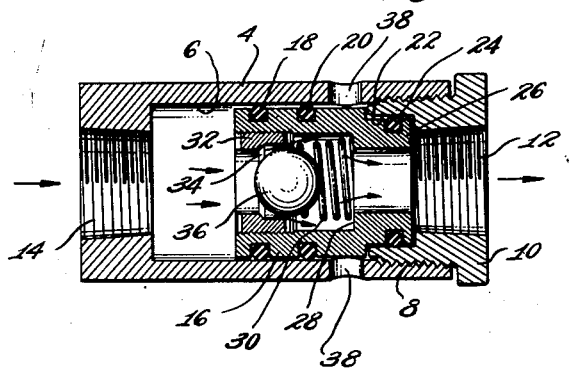
Fig. 1 is a longitudinal medial sectional view taken through the valve with the movable control element in the position for passing air or like fluid to the machine to be operated from a suitable source of supply.

In the construction shown in the drawings, the improved quick exhausting valve comprises a cylindrical body member 4 having a cylindrical bore 6 therein extending axially from one end to a point in spaced relation to the opposite end. The outer end is interiorly threaded as at 8 to receive an exteriorly threaded closure plug 10 which is provided with a threaded pipe opening 12.

The opposite end of the body member 4 is also provided with a threaded pipe opening 14 to which a source of fluid such as air under pressure may be connected.

The cylindrical bore 6 is adapted to receive an axially slidable fluid control piston valve or member, generally designated 16, the exterior surface of which is provided with axially spaced annular grooves for receiving O-ring seals 18 and 20 which seal the space between the piston 16 and the cylinder wall 6. The inner end of the closure fitting 10 is counterbored to provide a smooth cylindrical surface 22 having its open end flared or radiused so as to readily receive and slightly compress an O-ring seal 24 carried in an annular groove formed in the outer peripheral surface of a reduced end portion 26 which is adapted to have a loose working fit in the bore 22.

The piston valve 16 is through-bored, the bore being of two sizes to provide a shoulder 28 which serves as a seat for a helical compresion spring 30. The outer end of this portion of the bore is interiorly threaded to receive an exteriorly threaded annular plug 32 which is provided with a valve seat 34 for a ball valve 36. The ball valve 36 is normally urged against the seat 34 by the compression spring 30.

The valve body 4 is provided with a plurality of angularly spaced, radially extending apertures 38 through which air is exhausted to the atmosphere.

In the operation of this device, the assembled valve is secured to a suitable source of fluid under pressure by the threaded opening 14 being screwed to a supply pipe, and the threaded opening 12 is connected to a pipe leading to the machine, tool, or other apparatus which is to be operated by air under pressure.

When air is supplied to the valve, the pressure builds up within the cylinder 6 due to the compression spring 30 holding the ball valve 36 normally on its valve seat 34. The strength of the spring 30 is such that the ball valve 36 is held on its seat until the air pressure moves the piston valve 16 axially to the right, as viewed in Fig. 1, to the limit of its movement, as shown in that figure of the drawings. At this time, the reduced end 26 of the piston valve with its O-ring seal 24 is snugly fitted in the counterbore 22 of the closure plug 10.

When the piston valve 16 reaches its limit of movement, as shown in Fig. 1, the pressure of the incoming air will move the ball valve 36 off of its seat 34, as shown in Fig. 1, at which time air from the source of supply will pass around the ball, through the piston valve and out through the opening 12 to the machine or tool to be operated.

Figure 2:
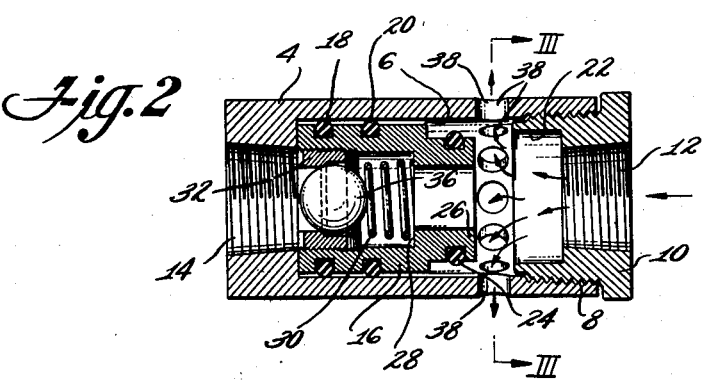
Fig. 2 is a similar view, but with the valve or air controlling member in the opposite position wherein the air which has been supplied to the operating tool is being vented to the atmosphere.
Figure 3:
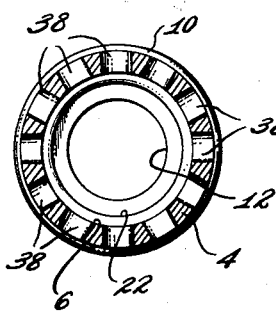
Fig. 3 is a transverse sectional view taken on the line III—III of Fig. 2, looking in the direction indicated by the arrows.

When the air supply is cut off and the chamber 6 vented to atmosphere, the air under pressure which has been supplied to the tool being operated, together with the compression spring 30, will seat the ball valve 36 on its seat 34 and thereupon the air pressure will move the piston valve 16 to the left to the limit of its movement, as shown in Fig. 2 of the drawings. When moved to this position, the air from the tool being operated, as shown by the arrows in Fig. 2, will escape out through the radial apertures 38 and thus be vented to the atmosphere.

Although but one specific embodiment of this invention has been herein shown and described,

We claim:

A quick exhausting valve of the class described comprising: a body member having a cylindrical chamber therein with inlet and outlet ends; said body member having pressure inlet and outlet ports communicating respectively with the inlet and outlet ends of the chamber; the outlet end of the chamber having a cylindrical reduction defining a shoulder, the reduction being flared at said shoulder; said body member having a vent opening communicating with the interior of the cylindrical chamber adjacent said reduction; a valve piston slidable in said chamber and having a valved passage therethrough with inlet and outlet ends, the outlet end of the piston being reduced; a seal disposed between the chamber wall and the piston adjacent the inlet end of the piston; a seal carried by the reduced end of the piston, said seal having less outer diameter than the larger portion of the cylindrical chamber but of a size to produce a sealing fit in the reduced end of the chamber when the piston is moved to a position at the outlet end of the chamber; in this position, the opening being located between the two seals and closed to flow from the outlet of the body member; the piston, when moved to a position at the inlet end of the chamber, having the seal of less diameter retracted from the reduced end of the chamber whereby an exhaust flow path is opened from the outlet of the chamber directly to the vent opening in the body, the piston being withdrawn from said flow path.

WARREN WILCOX.
DONALD E. DANIEL.

REFERENCES CITED

The following references are of record in the file of this patent:

UNITED STATES PATENTS

| Number | Name | Date |
|---|---|---|
| 832,178 | Weiland | Oct. 2, 1906 |
| 2,252,418 | Shelley | Aug. 12, 1941 |
| 2,270,549 | Orr | Jan. 20, 1942 |
| 2,358,228 | Hoof | Sept. 12, 1944 |
| 2,360,733 | Smith | Oct. 17, 1944 |
| 2,367,682 | Kehle | Jan. 23, 1945 |
| 2,445,505 | Ashton | July 20, 1948 |
| 2,501,706 | Bent | Mar. 28, 1950 |